United States Patent [19]

Moriwaki et al.

[11] Patent Number: 4,816,926
[45] Date of Patent: Mar. 28, 1989

[54] ROTARY HEAD DIGITAL AUDIO TAPE RECORDER WITH MULTIPLE RECORDING MODES

[75] Inventors: Hisayoshi Moriwaki; Kenji Nakano, both of Tokyo, Japan

[73] Assignee: Sony Corporation, Tokyo, Japan

[21] Appl. No.: 807,514

[22] PCT Filed: Apr. 18, 1985

[86] PCT No.: PCT/JP85/00213
§ 371 Date: Nov. 27, 1985
§ 102(e) Date: Nov. 27, 1985

[87] PCT Pub. No.: WO85/04979
PCT Pub. Date: Nov. 7, 1985

[30] Foreign Application Priority Data

Apr. 18, 1984 [JP] Japan .................. 59-78243

[51] Int. Cl.[4] .................................. G11B 5/09
[52] U.S. Cl. ............................ 360/8; 360/191; 360/22; 360/32
[58] Field of Search .......... 360/8, 18, 19.1, 22, 360/32

[56] References Cited

U.S. PATENT DOCUMENTS

| | | | |
|---|---|---|---|
| 3,789,137 | 1/1974 | Newell | 360/8 |
| 4,022,986 | 5/1977 | Teer et al. | 360/18 |
| 4,075,665 | 2/1978 | Borne et al. | 360/8 |
| 4,224,642 | 9/1980 | Mawatari et al. | 360/32 |
| 4,227,221 | 10/1980 | Kanazawa | 360/32 |
| 4,246,615 | 1/1981 | Shiraishi et al. | 360/8 |
| 4,303,950 | 12/1981 | Taniguchi et al. | 360/8 |
| 4,542,419 | 9/1985 | Moria et al. | 360/19.1 |
| 4,617,599 | 10/1986 | Noguchi et al. | 360/32 |

FOREIGN PATENT DOCUMENTS

| | | |
|---|---|---|
| 0085578 | 2/1983 | European Pat. Off. . |
| 57-176517 | 10/1982 | Japan . |
| 58-125209 | 7/1983 | Japan . |
| 59-38911 | 3/1984 | Japan . |
| 59-52403 | 3/1984 | Japan . |
| 60-50668 | 3/1985 | Japan . |
| 60-50753 | 3/1985 | Japan . |
| 2060227 | 10/1980 | United Kingdom . |
| 2080997 | 7/1981 | United Kingdom . |
| 2082828 | 8/1981 | United Kingdom . |

*Primary Examiner*—Raymond F. Cardillo
*Assistant Examiner*—Surinder Sachar
*Attorney, Agent, or Firm*—Lewis H. Eslinger; Jay H. Maioli

[57] ABSTRACT

This invention relates to an information signal recording apparatus which can be used also as an audio tape recorder only. When it is used only as the audio tape recorder, an audio signal is sampled with a frequency m times the sampling frequency of an audio signal which is used upon recording a video signal and the thus sampled PCM digital audio signal is diffusively recorded on at least two recording intervals thereby to improve the tone quality of the audio signal and the compatibility with the audio tape recorder using a video tape recorder of the same kind can be established.

3 Claims, 6 Drawing Sheets

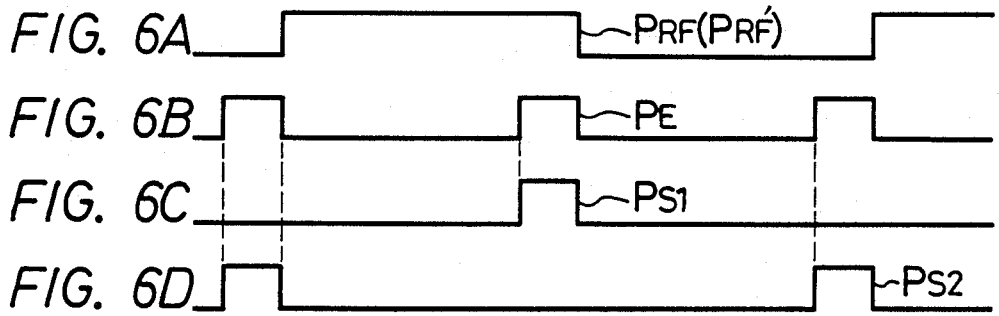
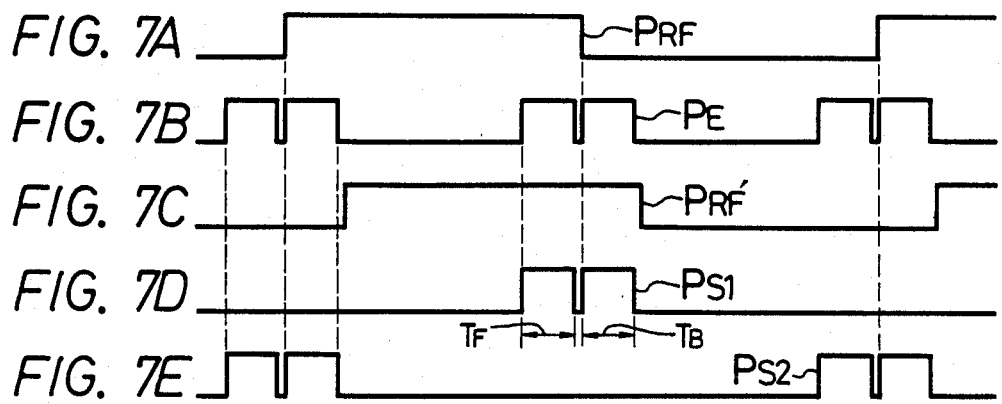
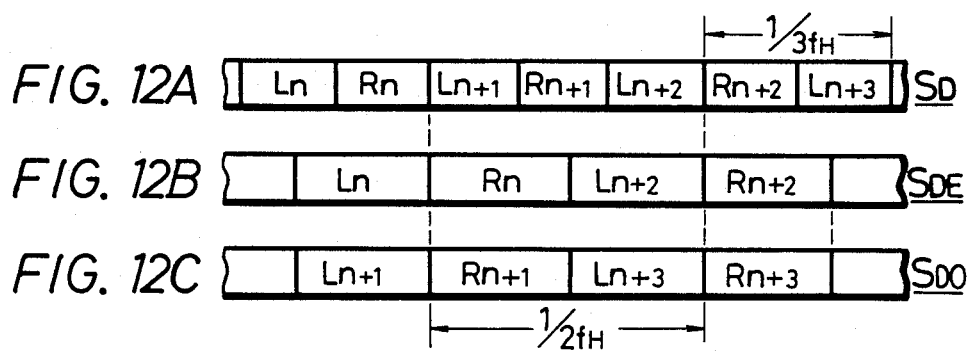

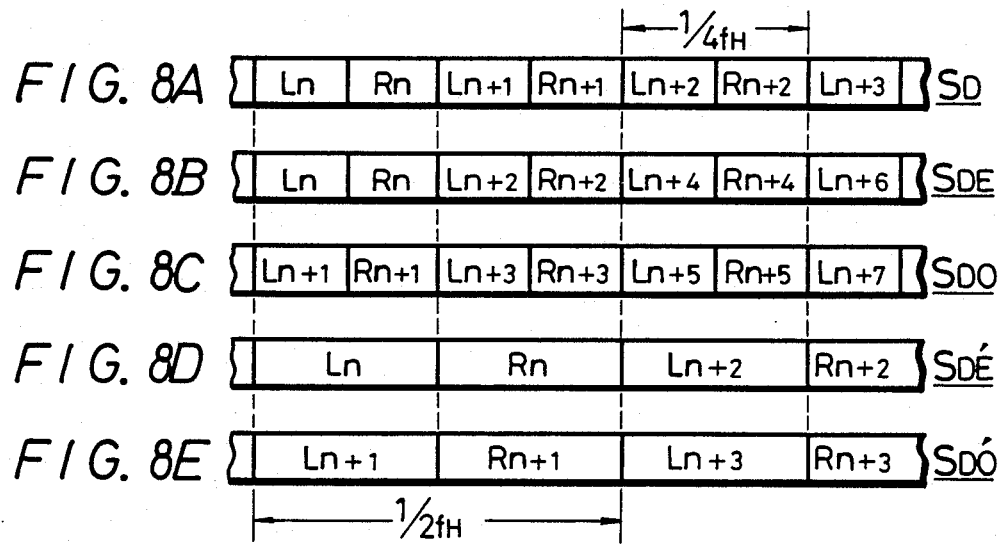
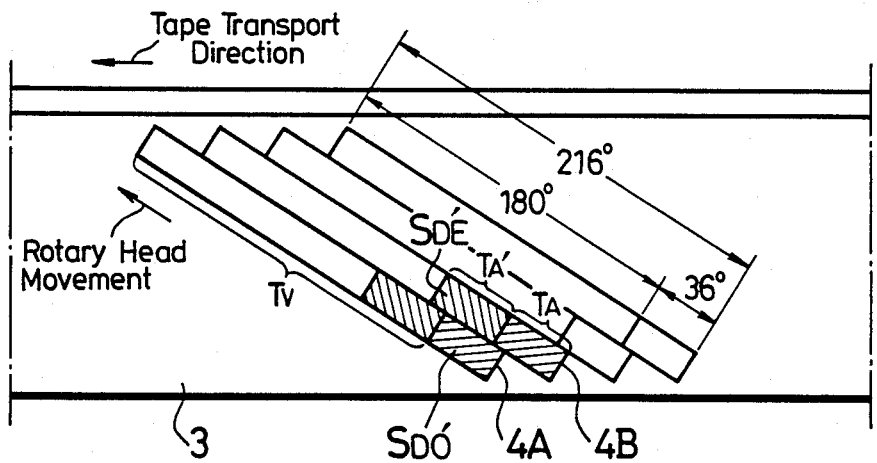

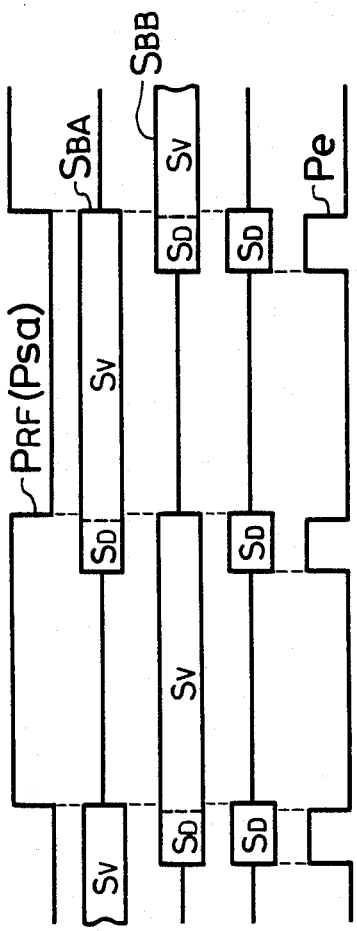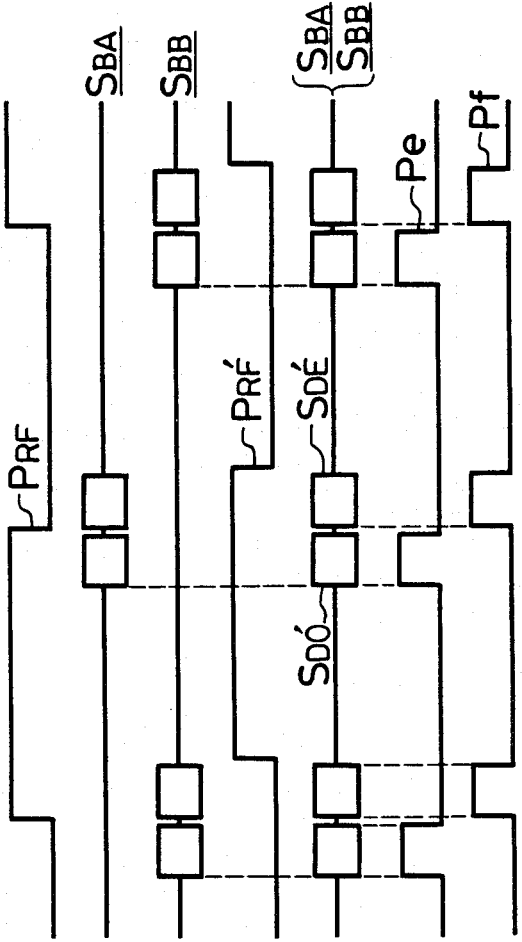

ROTARY HEAD DIGITAL AUDIO TAPE RECORDER WITH MULTIPLE RECORDING MODES

TECHNICAL FIELD

This invention relates to an information signal recording apparatus such as a small-sized cassette type video tape recorder (hereinbelow an 8 mm video tape recorder) in which a magnetic tape the tape width of which is, 8 mm is employed and which can be used also as only an audio tape recorder.

BACKGROUND ART

A rotary magnetic head assembly 1 used in, for example, an 8 mm video tape recorder consists of a pair of rotary heads $H_A$ and $H_B$ having different azimuth angles which are provided so as to keep an angular spacing of nearly 180° therebetween and a rotary drum 2 around which a magnetic tape 3 is obliquely wrapped over an angular range of a little over 216° as shown in FIG. 1.

FIG. 2 shows a track pattern formed by the rotary heads $H_A$ and $H_B$ when they trace the magnetic tape with the above tape wrapping angle, in which each of the slant tracks 4A and 4B is divided into a video signal recording interval (hereinafter a video interval) $T_V$ and an audio signal recording interval (hereinafter an audio interval) $T_A$ shown by a hatched area.

The audio interval $T_A$ is assigned to a duration of a rotation angle of nearly 36° of the rotary heads $H_A$ and $H_B$ when they have begun to contact with the magnetic tape 3, while the video interval $T_V$ is assigned to the remaining duration of nearly remaining 180°. A video signal of one field amount is recorded in the video interval $T_V$. In the audio interval $T_A$, there is recorded an audio signal relating to the video signal of one field amount as a PCM digital audio signal under the condition that the time base thereof is compressed.

There is proposed such an 8 mm video tape recorder having such tape format which can be used also as an audio tape recorder U.S. Pat. No. 4,542,419 issued Sept. 17, 1985.

According to the technique disclosed in the above patent, when the video tape recorder is used only as an audio tape recorder, the video interval $T_V$ is used as the audio interval $T_A$. Since the video interval $T_V$ is 5 times as long as the audio interval $T_A$, the audio intervals $T_A$ of ⓪ to ⑤ can be recorded each of the slant tracks 4A and 4B as shown in FIG. 3. Accordingly, when the audio signal from the same source is recorded, the recording time becomes 6 times as compared with that when being used as the video tape recorder. Further, when different audio signals are recorded on the respective audio intervals $T_A$ of ⓪ to ⑤, the audio signals of 6 channel amounts can be recorded simultaneously.

By the way, since the audio signal is the PCM digital audio signal as described hereinabove and the sampling frequency thereof is $2f_H$ ($f_H$ is the horizontal frequency), the frequency band thereof is narrower than that of the audio signal reproduced from a PCM audio compact disc and hence the quality of the audio signal is deteriorated.

That is, according to the audio tape recorder provided by the prior art disclosed in the above published document, the recording time can be prolonged or the number of the recording channels can be increased but the tone quality is not improved at all.

Therefore, this invention is to propose an information signal recording apparatus which can improve a tone quality of an audio signal obtained when the apparatus is used as only an audio tape recorder and which is arranged to be compatible so that an audio signal, which is recorded to improve the tone quality, can be reproduced by a prior art audio tape recorder.

DISCLOSURE OF INVENTION

In accordance with the present invention, when recording only an audio signal, a plurality of recording intervals that are the same as an audio signal recording interval are formed on a magnetic track, and a PCM digital audio signal sampled by the frequency m times (m is an integer) the sampling frequency $f_s$ of an audio signal used upon recording a video signal is recorded on at least two recording intervals of the plurality of recording intervals under the condition that the time base thereof is compressed.

According to this circuit arrangement, since the sampling frequency becomes m times the sampling frequency of the audio signal, the frequency characteristic is extended to the high frequency band so that the tone quality can be improved. Further, since the audio signal is diffusively recorded on at least two recording intervals, the apparatus of the present invention can achieve a compatibility with a prior art audio tape recorder which uses one recording interval to record the audio signal.

BRIEF DESCRIPTION OF DRAWINGS

FIGS. 6 to 8E and FIGS. 10 to 12C are respectively waveform diagrams useful for explaining the operation thereof, and FIG. 9 is a track pattern diagram useful for explaining the operation thereof.

BEST MODE FOR CARRYING OUT THE INVENTION

An information signal recording apparatus according to this invention will be described in detail with reference to FIG. 4 and the followings, in which an embodiment of the apparatus is applied to the 8 mm video tape recorder.

Figure 4:
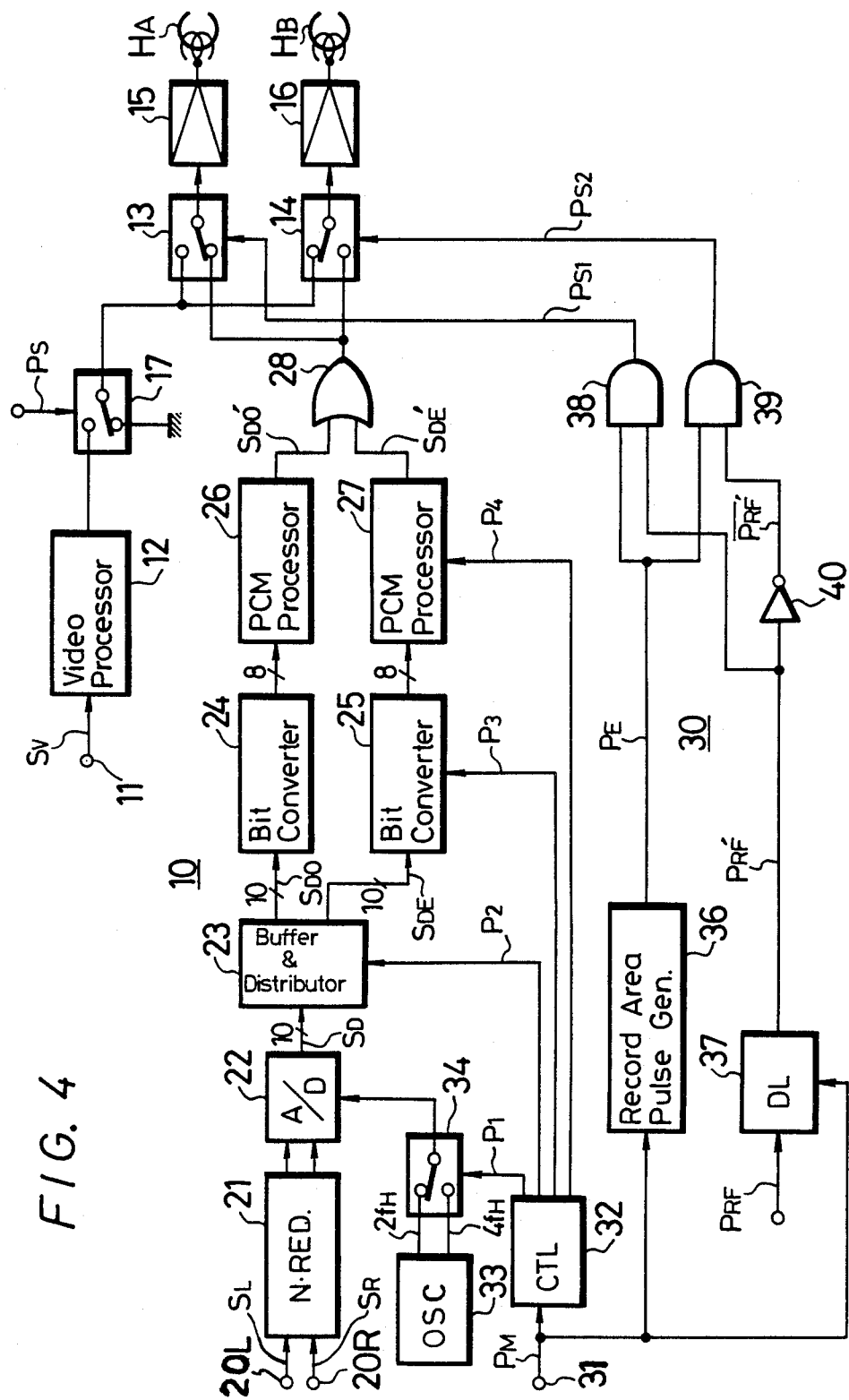
FIG. 4 is a systematic diagram showing a main part of an embodiment of an information signal recording apparatus according to this invention.

FIG. 4 is a systematic diagram showing a main part of an embodiment of an information signal recording apparatus 10 according to the present invention. A video signal Sv applied to a terminal 11 is supplied to a video processor 12 which processes it to become a signal having a suitable signal format. Then, it is supplied to a pair of switching circuits 13 and 14, in which the video signal Sv is alternately selected at every field. The respective video signals Sv are respectively supplied via amplifiers 15 and 16 to the corresponding rotary heads $H_A$ and $H_B$ and thereby recorded on the corresponding video intervals $T_V$ at every field.

A switching circuit 17, provided at the output stage of the video processor 12, is changed in position to the earth terminal side only when the apparatus is used as the audio tape recorder, preventing the video output Sv from being supplied to the rotary heads $H_A$ and $H_B$. Therefore, a switching pulse Ps is such a pulse which relates to the changing-over (manually) of the using mode between the video tape recorder and only the audio tape recorder.

Left and right audio signals $S_L$ and $S_R$ fed to terminals 20L and 20R are supplied to a noise reduction circuit 21, in which the noises thereof are reduced. Then, they are supplied to an A/D converter 22 and thereby the left and right audio signals $S_L$ and $S_R$ are alternately A/D-converted. In the video tape recorder, a sampling frequency $f_s$ for A/D conversion is $2f_H$ ($f_H$ is the horizontal frequency) and the quantization bit number is 10 bits. A PCM digital audio signal $S_D$ is supplied to a data distributor 23 serving as a buffer and then to a pair of bit converters 24 and 25 in which it is subjected to a 10-8 bit compressing processing.

When the above apparatus is used as the video tape recorder, the function of the data distributer 23 is inhibited and also the function of one bit converter 25 is inhibited.

8-bit non-linearly quantized digital audio signals $S_D$ ($S_{DO}$ and $S_{DE}$) are respectively supplied to PCM processors 26 and 27 each of which uses the frequency $2f_H$ as the clock frequency thereof, in which their error correction and interleave processing are carried out. Then, the digital audio signal $S_D$ corresponding to the video signal $S_V$ of one field is compressed in time base by using a RAM and the like. The digital audio signal $S_D$($S_{DO}'$, $S_{DE}'$) with the time base compressed is supplied through an OR circuit 28 to the pair of switching circuits 13 and 14, respectively.

The pair of switching circuits 13 and 14 carry out different switching operation between the video tape recorder and the audio only tape recorder. Further, the signal system from the A/D converter 22 to the PCM processor 27 becomes different signal systems between when the apparatus is used as the video tape recorder and only the audio tape recorder. Reference numeral 30 shows an example of a control circuit for producing various signals necessary for such operation modes.

In the control circuit 30, to a terminal 31, there is supplied a control pulse $P_M$ relating to the changing-over of the apparatus between the video tape recorder and the audio tape recorder. In response to the control pulse, a control pulse generating circuit 32 produces predetermined control pulses $P_1$ to $P_4$. The control pulse $P_1$ is used to change-over the sampling frequencies $f_s$ and $f_s'$ that are to be supplied to the A/D converter 22. The sampling frequencies $f_s = nf_H$ and $f_s' = mf_s$ (n is a positive number and m is an integer), generated from an oscillator 33 are supplied to a switching circuit 34 and any one of the sampling frequencies $f_s$ and $f_s'$ selected by the afore-mentioned control pulse $P_1$ is supplied to the A/D converter 22.

The control pulse $P_2$ is used to control the data distributor 23, the control pulse $P_3$ is used to control one bit converter 25 and the control pulse $P_4$ is used to control one PCM processor 27.

The control pulse $P_M$ is further supplied to a generating circuit 36 for generating a recording area pulse $P_E$ and to a delay circuit 37 for delaying a head switching pulse $P_{RF}$. As will be described later, when the control pulse $P_M$ is "L", one recording area pulse $P_E$ is generated per one field, while when it is "H", there are produced two recording area pulses $P_E$ per one field. Further, only when the control pulse $P_M$ is "H", the head switching pulse $P_{RF}$ is delayed by a predetermined time.

The recording area pulse $P_E$ and the head switching pulse $P_{RF}$ are supplied to a first AND circuit 38 which generates a switching pulse $P_{S1}$, while this recording area pulse $P_E$ and a head switching pulse $\overline{P_{RF}}$, which results from inverting the head switching pulse by an inverter 40, are supplied to a second AND circuit 39 which produces a switching pulse $P_{S2}$. The switching pulse $P_{S1}$ is supplied to the first switching circuit 13 and the switching pulse $P_{S2}$ is supplied to the second switching circuit 14, respectively.

In this circuit arrangement, let it be assumed that in the video tape recorder mode, the control pulse $P_M$ becomes "L", while in the audio only tape recorder mode, it becomes "H". First of all, the video tape recorder mode (normal use mode) will be described.

In the video tape recorder mode, the sampling frequency $f_s$ of $2f_H$ is selected by the control pulse $P_1$ generated upon this mode and the data distributor 23, the bit converter 25 and the PCM processor 27 are stopped in function by the control pulses $P_2$ to $P_4$. As a result, the digital audio signal $S_D$, which is sampled by the sampling frequency $2f_H$, is passed through the data distributor 23, bit-converted and pulse code-modulated. Thereafter, it is fed to the pair of switching circuits 13 and 14.

Figure 1:
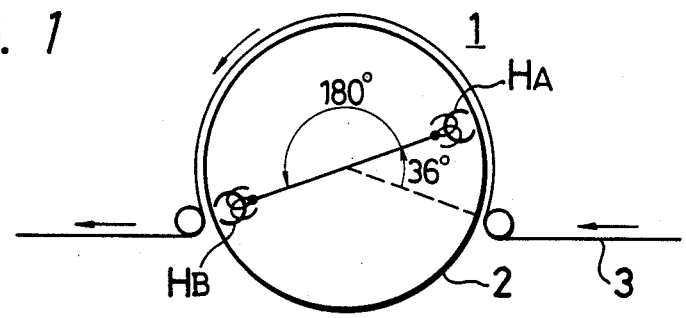
FIG. 1 is a diagram showing an example of a video tape recorder useful for explaining this invention.
Figure 2:
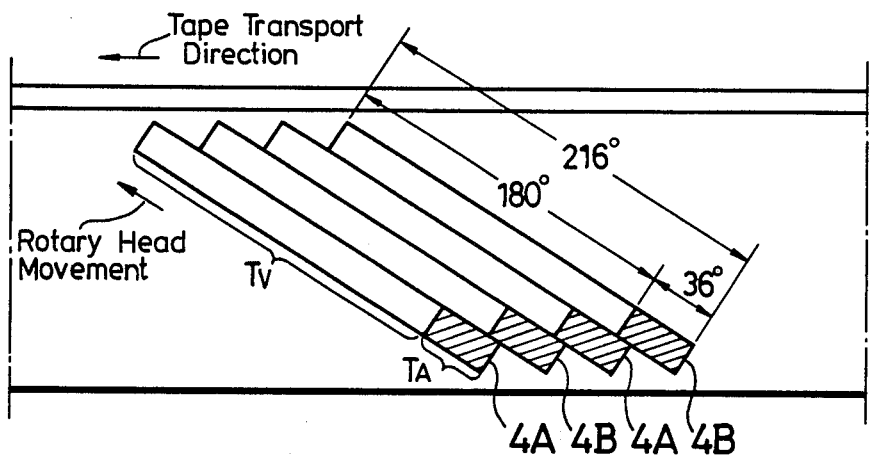
FIGS. 2 and 3 are track pattern diagrams useful for explaining the operation thereof.

Further, in this mode, one recording area pulse $P_E$ shown in FIG. 6B is generated. In this example, the pulse width and the pulse generating timing of the recording area pulse $P_E$ are determined such that it is produced in correspondence with the audio interval $T_A$ shown in FIG. 2. Since the head switching pulse $P_{RF}$ (FIG. 6A) is supplied to the first and second AND circuits 38 and 39 as it is, therefrom there are produced the first and second switching pulses $P_{S1}$ and $P_{S2}$ as shown in FIGS. 6C and 6D. When the first and second switching pulses $P_{S1}$ and $P_{S2}$ are respectively "H", the movable contact arms of the switching circuits 13 and 14 are changed in position to the sides shown by the solid lines. Since the period of the head switching pulse $P_{RF}$ corresponds to the video interval $T_V$ shown in FIG. 2, during a predetermined period until each video interval $T_V$ begins, or only during the audio interval $T_A$, the digital audio signal $S_D$ is supplied to the corresponding rotary heads $H_A$ and $H_B$ and thereby the digital audio signal $S_D$ is recorded.

During a period in which the first and second switching pulses $P_{S1}$ and $P_{S2}$ are "L", the video signal $S_V$ is recorded on the video interval $T_V$. Accordingly, the video signal $S_V$ and the digital audio signal $S_D$ are recorded with normal recording patterns.

On the contrary, when the video tape recorder is changed over in mode to the audio tape recorder mode which is intended to improve the tone quality, the mfs is selected as the sampling frequency $f_s'$. In this embodiment, in order to improve the frequency characteristics of the audio signals $S_L$ and $S_R$, m=2 and, accordingly, n=4 are established so that the audio signals $S_L$ and $S_R$ are sampled by the sampling frequency twice the sampling frequency used in the video tape recorder and thereby converted to the PCM digital audio signal $S_D$.

Further, by the control pulses $P_2$ to $P_4$, the data distributor 23, the bit converter 25 and the PCM processor 17 are respectively operated to sequentially distributes the data alternately in such a manner that on the basis of the left and right portions L and R of the digital audio signal $S_D$ in which left and right audio signals $S_L$ and $S_R$ are alternately and sequentially digitized as shown in FIG. 8A, the data distributor 23 alternately distributes an odd digital audio signal $S_{DO}$ as shown in, for example, FIG. 8C to one bit converter 24 and an even digital audio signal $S_{DE}$ as shown in FIG. 8B to the other bit converter 25, sequentially.

The digital audio signals $S_{DO}$ and $S_{DE}$ thus bit-converted are respectively subjected to the pre-determined digitizing process in the PCM processors 26 and 27. The processing rates of the PCM processors 26 and 27 are each $\frac{1}{2}f_H$ same as that of the video tape recorder. Accordingly, the digital audio signals $S_{DO}'$ and $S_{DE}'$ after being digitally processed become as shown in FIGS. 8D and 8E. The output timing of one digital audio signal $S_{DE}'$ is provided after one digital audio signal $S_{DO}'$ was produced.

When the apparatus is used as only the audio tape recorder as mentioned above, the generating circuit 36 produces the two recording area pulses $P_E$ shown in FIG. 7B. The former pulse of the recording area pulses $P_E$ corresponds to the audio interval $T_A$ shown in FIG. 2 as described above in this embodiment, while the latter pulse corresponds to an auxiliary audio interval $T_A'$ whose length is the same as the audio interval which follows the audio interval $T_A$ in the video interval $T_V$ as shown in FIG. 9 in this embodiment. In the audio tape recorder only, the delay circuit 37 is operated to delay the head switching pulse $P_{RF}$ by a time substantially equal to the auxiliary audio interval $T_A'$, resulting in a delay pulse $P_{RF}'$ shown in FIG. 7C.

As a result, since the first and second switching pulses $P_{S1}$ and $P_{S2}$ shown in FIGS. 7D and 7E are generated, one digital signal $S_{DO}'$ is recorded during a period $T_F$, while the other digital signal $S_{DE}'$ is recorded during a period $T_B$.

When the apparatus is used as the audio tape recorder, the video line is grounded by the switching circuit 17 so that only the digital signals $S_{DO}'$ and $S_{DE}'$ are recorded.

Figure 5:
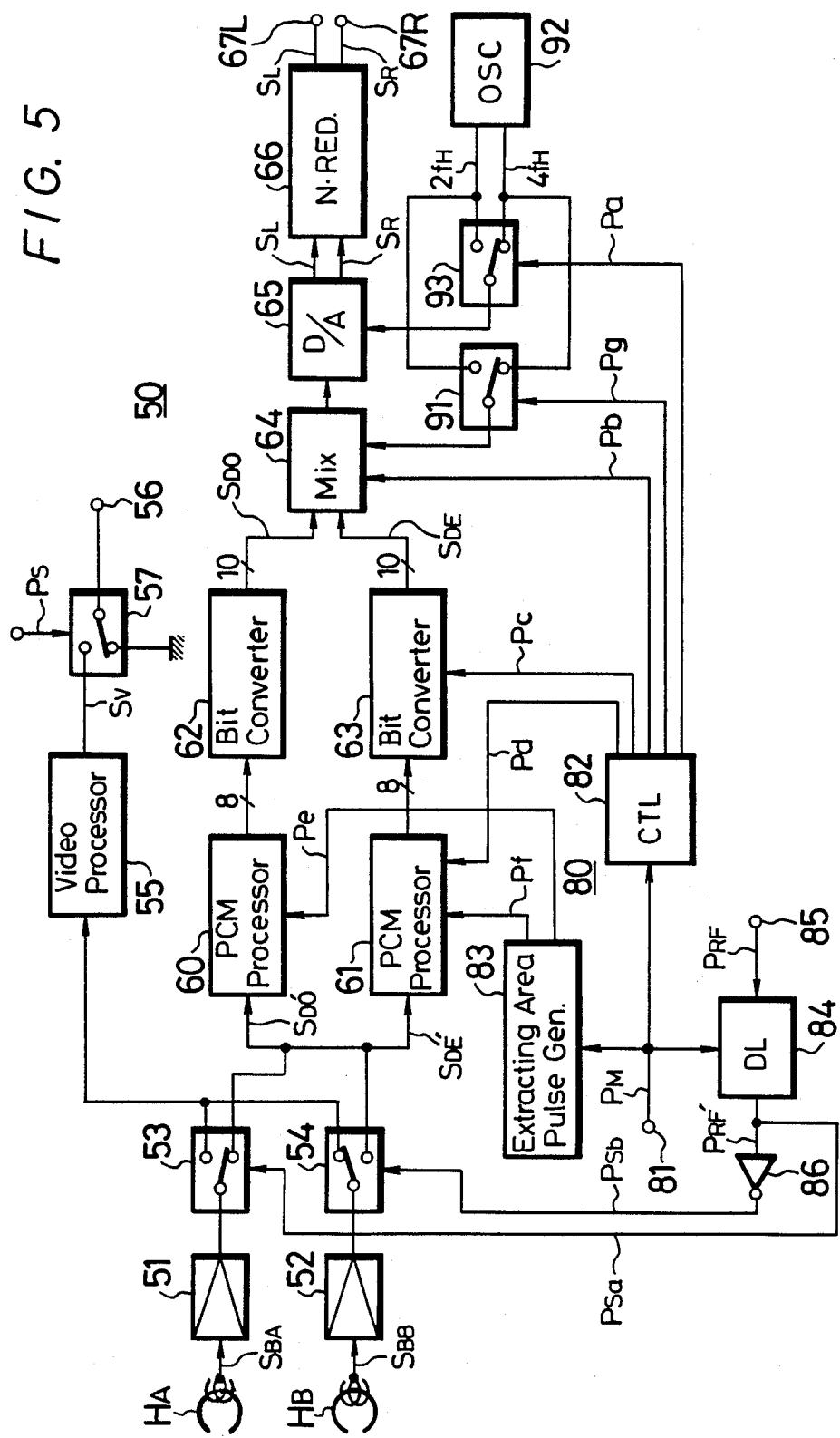
FIG. 5 is a systematic diagram showing a main part of an embodiment of a reproducing apparatus thereof.

FIG. 5 shows an example of a reproducing apparatus 50.

The video signal Sv and the digital audio signals $S_D$, $S_{DO}'$ and $S_{DE}'$ reproduced by the rotary heads $H_A$ and $H_B$ are supplied through pre-amplifiers 51 and 52 to a pair of switching circuits 53 and 54. The video signals Sv selected thereby are reconverted to the original signal form by a video processor 55 and the resultant video signal is delivered to an output terminal 56. A switching circuit 57 is changed in position to the earth side by a control pulse Ps only when the apparatus is used as the audio only tape recorder. On the other hand, the digital audio signals selected by the switching circuits 53 and 54 are corrected for error and time base-compressed, etc., by a pair of PCM processors 60 and 61. Thereafter, they are respectively supplied to bit converters 62 and 63, in which they are subjected to 8-10 conversion. The 10-bit digital audio signals $S_{DO}$ and $S_{DE}$ are then supplied through a mixer 64 to a D/A converter 65 and thereby converted to analog signals. Then, the left and right audio signals $S_L$ and $S_R$ therefrom are subjected to the noise reduction processing by a noise reduction circuit 66 and then final audio signals $S_L$ and $S_R$ are developed at output terminals 67L and 67R, respectively.

A control circuit 80 produces control pulses that are opposite to those of the recording system. On the basis of a control pulse $P_M$ applied to a terminal 81, a pulse generating circuit 82 generates control pulses Pa to Pd. The control pulse $P_M$ is further supplied to an extracting area pulse generating circuit 83 which produces a pair of extracting area pulses Pe and Pf. The control pulse $P_M$ is further fed to a delay circuit 84, whereby the head switching pulse $P_{RF}$ applied to a terminal 85 is delayed by a predetermined delay time and then delivered. The delayed pulse $P_{RF}'$ itself is used as a first switching pulse Psa, while a delay pulse $\overline{P_{RF}'}$ from an inverter 86 is used as a second switching pulse Psb. Reference numeral 92 designates an oscillating circuit for generating frequencies, $2f_H$ and $4f_H$ and reference numeral 93 designates a switching circuit therefor.

According to this circuit arrangement, in the normal operation mode in which the apparatus is used as the video tape recorder, the delay circuit 84 is in an inoperative state so that the head switching pulse $P_{RF}$ and the phase-inverted pulse thereof are supplied to the first and second switching circuits 53 and 54 as the first and second switching pulses Psa and Psb, respectively, whereby the outputs $S_{BA}$ and $S_{BB}$ (FIGS. 10B and 10C) reproduced by the rotary heads $H_A$ and $H_B$ are changed over. Of the reproduced outputs $S_{BA}$ and $S_{BB}$, the video signals Sv are supplied to the video processor 55.

The control pulses Pc and Pd generated in the video tape recorder mode inhibit the functions of both the bit converter 63 and the PCM processor 61 and the control pulse Pb controls the mixer 64 to be set in the through-state. Further, by the control pulse Pa, switching means 88 is controlled so that of the clocks $2f_H$ and $4f_H$ generated from the oscillator 89, the clock with the frequency $2f_H$ is selected and then fed to the D/A converter 65.

Further, the pulse generating circuit 83 produces a latching area pulse Pe shown in FIG. 10E. This pulse is supplied to the PCM processor 60 which latches one of the reproduced outputs $S_{BA}$ and $S_{BB}$ reproduced by the rotary heads $H_A$ and $H_B$ during an interval corresponding to the audio interval $T_A$. That is, only the digital audio signal $S_D$ is latched (FIG. 10D) therein, digitized and then converted to 10-bit data by the bit converter 62. Thus this data is converted to an analog signal by the clock signal with the frequency $2f_H$.

In the audio tape recorder operation mode, by the control pulses Pd to Pb, the PCM processor 61, the bit converter 63 and the mixer 64 are respectively operated while by the control pulse Pa, the clock with the frequency $4f_H$ is selected. Further, the delay circuit 84 is operated and the head switching pulse $P_{RF}$ is delayed by the delay time substantially same as auxiliary audio interval $T_A$. This delayed pulse is supplied to the first switching circuit 53 as the first switching pulse Psa and the phase-inverted pulse thereof is supplied to the second switching circuit 54 as the second switching pulse Psb, so that the reproduced outputs $S_{BA}$ and $S_{BB}$ shown in FIGS. 11B and 11C are converted to a signal series shown in FIG. 11E, which then are fed to the PCM processors 60 and 61.

In the audio tape recorder operation mode, the latch area pulse Pe (FIG. 11F) corresponding to the audio interval $T_A$ is generated and the latch area pulse Pf (FIG. 11G) corresponding to the auxiliary audio interval $T_A'$ is also generated, which then is fed to the other PCM processor 61.

Accordingly, in the PCM processor 60, the digital audio signal $S_{DO}'$ is time base-expanded, while in the other PCM processor 61, the digital audio signal $S_{DE}'$ is time base-expanded, then they are digitally processed on the basis of the clock with frequency $2f_H$, converted to the 10-bit data and then fed to the mixer 64. This mixer 64 is such a circuit to reconvert the digital audio signals $S_{DO}'$ and $S_{DE}'$ shown in FIGS. 8D and 8E to the digital audio signal $S_D$ shown in FIG. 8A and which is formed of a buffer memory and a switching circuit though not shown. The buffer memory is supplied with the write clock with the frequency $2f_H$ and the read clock with the frequency $4f_H$ through a switching means 91. The switching means 91 is changed in position by a control pulse Pg from the pulse generating circuit 80. The digital audio signal $S_D$ thus reversely converted is D/A-converted by the clock with the frequency $4f_H$.

As mentioned above, in the audio tape recorder mode, by increasing the sampling frequency $f_s'$ of the audio signal to $4f_H$ and digitizing the same, the frequency band of the reproduced audio signal can be extended to the frequency band region much higher than that of the prior art. Although the data amount is increased twice by changing the sampling frequency $f_s'$ to $4f_H$, by providing the auxiliary audio interval $T_A'$ in the video interval $T_V$, the increased data amount can be recorded on the auxiliary audio interval $T_A'$. When the audio data is recorded on the two recording areas separately, if the left and right audio data are alternately dispersed and then recorded on the respective recording areas as described hereinabove, even though the audio signal is reproduced by the prior art tape recorder, the audio data recorded on one of the audio interval $T_A$ and the auxiliary audio interval $T_A'$ can be reproduced. Therefore, the original audio signal can be reproduced only from the audio data recorded on one of them. In this case, however, the frequency characteristic is deteriorated.

In such case, if the former half of the audio data is recorded on the audio interval $T_A$ and the latter half thereof is recorded on the auxiliary audio interval $T_A'$, it is not possible to reproduce the original audio signal only by the audio interval $T_A$.

When the audio data is diffusively recorded, it may be possible that the left audio data is recorded on the audio interval $T_A$, while the right audio data is recorded on the auxiliary audio interval $T_A'$, respectively. At that time, in the reproducing apparatus 50, if the left and right audio signals thus D/A-converted are supplied to the noise reduction circuit 66 under the condition that they are short-circuited, the monaural mode is presented. It is needless to say that if they are reproduced in only the audio mode, it is possible to obtain a quasi-monaural sound of which the frequency characteristic is extended twice.

Further, since this recording apparatus 10 can be used as the audio tape recorder only by adding the bit converter, the PCM processor and the data distributor to the circuit system thereof used as the video apparatus, the circuit arrangement thereof can be simplified.

While in the above description the frequency $4f_H$ is selected as the sampling frequency $f_s'$ to thereby extend the frequency characteristic twice the prior art, it is possible to obtain the frequency characteristic 1.5 times the prior art by establishing $f_s' = 3f_H$.

In this case, the digital audio signal $S_D$ that was sampled by the frequency $3f_H$ is converted to the sampling mode with the frequency $2f_H$ (FIGS. 12A to 12C) by the data distributor 23. Then, similar to the case of FIG. 4, the data is distributed so that the first digital audio signal $S_{DO}$ (FIG. 12B) is supplied to the first bit converter 24, while the second digital audio signal $S_{DE}$ (FIG. 12C) is supplied to the second bit converter 25.

If the sampling rate is changed as described above, parts of the audio interval $T_A$ and the auxiliary audio interval $T_A'$ become respectively a non-recording interval. For this reason, in order to match the signal format with the recording format of the 8 mm video tape recorder, a dummy data is recorded on each of the non-recording intervals. As the dummy data, it is possible to use the data stored in the time base compressing RAMs which are provided in the PCM processors 26 and 27.

While in the afore-mentioned embodiment the audio signal of one channel amount is recorded, it is possible to record the audio signals of 3 channels simultaneously by utilizing all areas of the video interval $T_V$. If so, in the case of the same channel, it is possible to prolong the recording time three times as long as that of the prior art.

Figure 3:
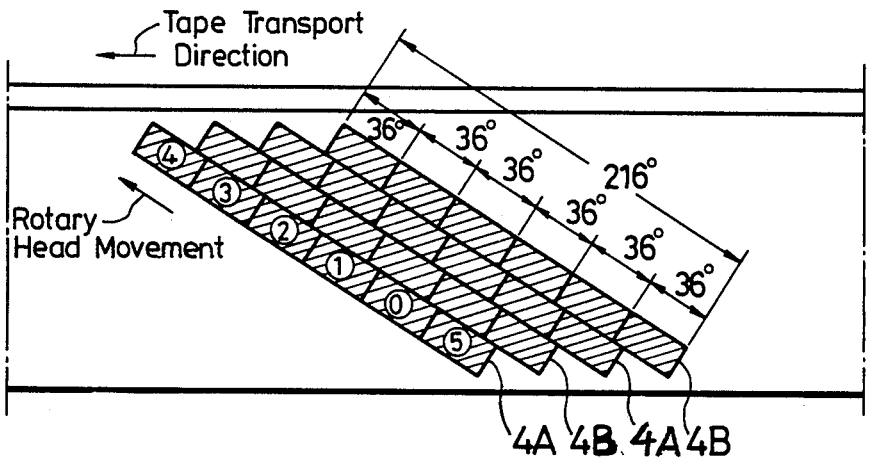

Further, it is not necessary to divide the recording intervals in good order as the first channel is assigned to the intervals ⑤ and ⓪; the second channel is assigned to the intervals ① and ②; and the third interval is assigned to the intervals ③ and ④ as shown in FIG. 3 but it is possible to record a single channel or a plurality of channels by using any desired two intervals.

Furthermore, if the audio interval $T_A$ is used as one recording interval, the original audio signal can be reproduced only from the audio data recorded on the audio interval $T_A$ by re-recording the predetermined video signal Sv on the video interval $T_V$ after the audio tape recorder mode was changed over into the video tape recorder mode.

As set forth above, according to this invention, when the apparatus is used only as the audio tape recorder, the frequency characteristic of the reproduced audio signal can be extended more than 1.5 times that of the prior art so that it is possible to easily realize the audio tape recorder of simple arrangement with high tone quality.

In addition, according to this invention, when the audio data is diffusively recorded as mentioned above, the original audio signal can be reproduced with high fidelity by the prior art audio tape recorder although the frequency characteristic is a little deteriorated. Therefore, it is possible to realize a recording apparatus having the compatibility.

We claim:

1. An information signal recording apparatus in which on one slant magnetic track formed by a rotary head a PCM digital audio signal is recorded under the condition that the time base thereof is compressed, said information signal recording apparatus being formed such that a plurality of recording segments each of which is the same in length are established on said magnetic track, said apparatus comprising:
   (a) an analog-to-digital converter for converting an analog audio input signal into a digital audio signal using a first sampling frequency $f_s$ in a first mode and a second sampling frequency $mf_s$ (m is an integer in a second mode;
   (b) a data distributor for distributing the output of said analog-to-digital converter to two lines alternately in said second mode;
   (c) a first PCM processor and a second PCM processor for respectively encoding the output of said two lines from said data distributor, said first and second PCM processors each having a digital processing rate at $1/f_s$ and each processing data with a predetermined quantization bit number; and
   (d) a mode controller for selectively providing said first mode in which a PCM digital audio signal sampled at said first sampling frequency $f_s$ and processed at said $1/f_s$ rate and with said predetermined quantization bit number in said first PCM processor is recorded on at least one recording segment of said plurality of recording segments, and for selectively providing said second mode in which a PCM digital audio signal sampled at said second sampling frequency $mf_s$ and processed at said $1/f_s$ rate and with the same predetermined quantization bit number as in said first mode in both of said first and second PCM processors is diffusively recorded on at least m recording segments.

2. An information signal recording apparatus according to claim 1, further comprising a third mode in which on said at least one recording segment a PCM digital audio signal is recorded while on another magnetic track region a frequency modulated video signal is recorded.

3. An information signal recording apparatus according to claim 1, in which said PCM digital audio signals in said first and second modes include left and right audio signals of a stereo audio signal.

* * * * *